United States Patent
Gray

(10) Patent No.: US 9,798,443 B1
(45) Date of Patent: Oct. 24, 2017

(54) APPROACHES FOR SEAMLESSLY LAUNCHING APPLICATIONS

(71) Applicant: Amazon Technologies, Inc., Reno, NV (US)

(72) Inventor: Timothy Thomas Gray, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 298 days.

(21) Appl. No.: 14/023,375

(22) Filed: Sep. 10, 2013

(51) Int. Cl.
*G06F 3/048* (2013.01)
*G06F 3/0482* (2013.01)
*G06F 3/0481* (2013.01)
*G06F 3/0488* (2013.01)

(52) U.S. Cl.
CPC .......... *G06F 3/0482* (2013.01); *G06F 3/0488* (2013.01); *G06F 3/04817* (2013.01)

(58) Field of Classification Search
CPC ... G06F 3/04817; G06F 3/0482; G06F 3/0488
USPC ................................................. 715/204, 811
See application file for complete search history.

(56) References Cited

U.S. PATENT DOCUMENTS

| | | | | |
|---|---|---|---|---|
| 7,705,833 B2* | 4/2010 | Kim | ............... | G06F 3/04886 345/173 |
| 2007/0083911 A1* | 4/2007 | Madden | ............... | G06F 3/0482 725/135 |
| 2007/0157094 A1* | 7/2007 | Lemay | ............... | G06F 3/0483 715/717 |
| 2008/0094370 A1* | 4/2008 | Ording | ............... | G06F 3/04883 345/173 |
| 2008/0122796 A1* | 5/2008 | Jobs | ............... | G06F 3/0488 345/173 |
| 2008/0215978 A1* | 9/2008 | Bamba | ............... | G06F 3/0482 715/713 |
| 2009/0199130 A1* | 8/2009 | Tsern | ............... | G04G 21/08 715/810 |
| 2013/0104075 A1* | 4/2013 | Matthews | ............... | G06F 3/0481 715/800 |
| 2013/0111407 A1* | 5/2013 | Mullen | ............... | G06F 8/61 715/834 |
| 2013/0283185 A1* | 10/2013 | Mock | ............... | G06Q 10/103 715/746 |
| 2013/0326421 A1* | 12/2013 | Jo | ............... | G06F 3/04883 715/841 |

(Continued)

*Primary Examiner* — William Bashore
*Assistant Examiner* — Gregory A Distefano
(74) *Attorney, Agent, or Firm* — Polsinelli LLP

(57) ABSTRACT

A set of application icons can be displayed on an interface (e.g., a home screen) of a computing device. The icons can include a center icon and at least one of a subset of application icons to the left or to the right of the center application icon. Displayed below the icons can be a portion of an application window. The application window can be associated with the center application icon and can display content associated with the center application icon. The user can utilize a fingertip or object to select an area of a display screen associated with the application window and the user can perform an input motion from the area to a region associated with the set of application icons to animate a departure of the icons and an expansion of the application window to display additional content. Further, the input motion can enable at least one additional function associated with the application window.

20 Claims, 8 Drawing Sheets

(56) References Cited

U.S. PATENT DOCUMENTS

2014/0152693 A1* 6/2014 Radakovitz ........... G06F 3/0482
345/629
2016/0092071 A1* 3/2016 Lawson ................ G06F 3/0482
345/156

* cited by examiner

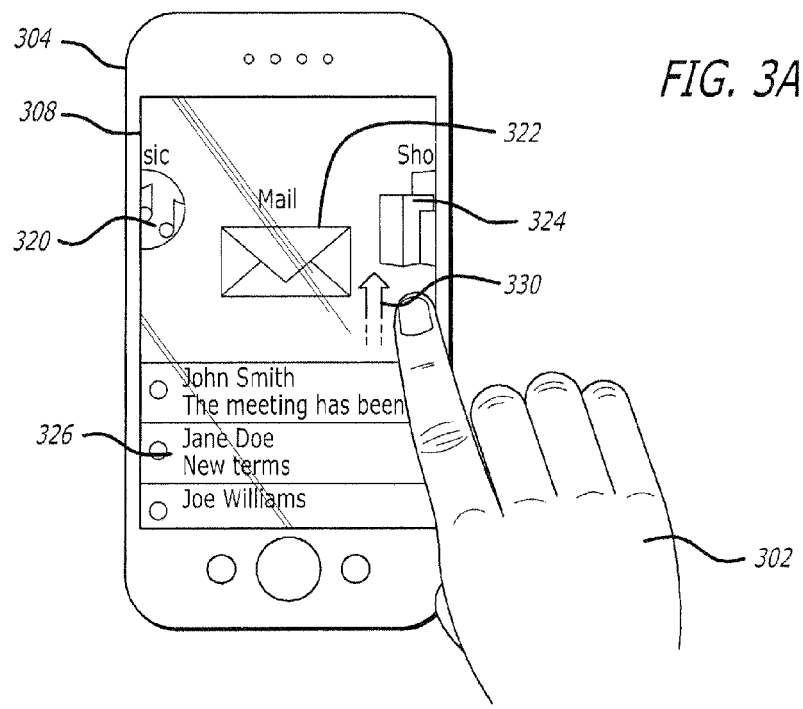
FIG. 3A
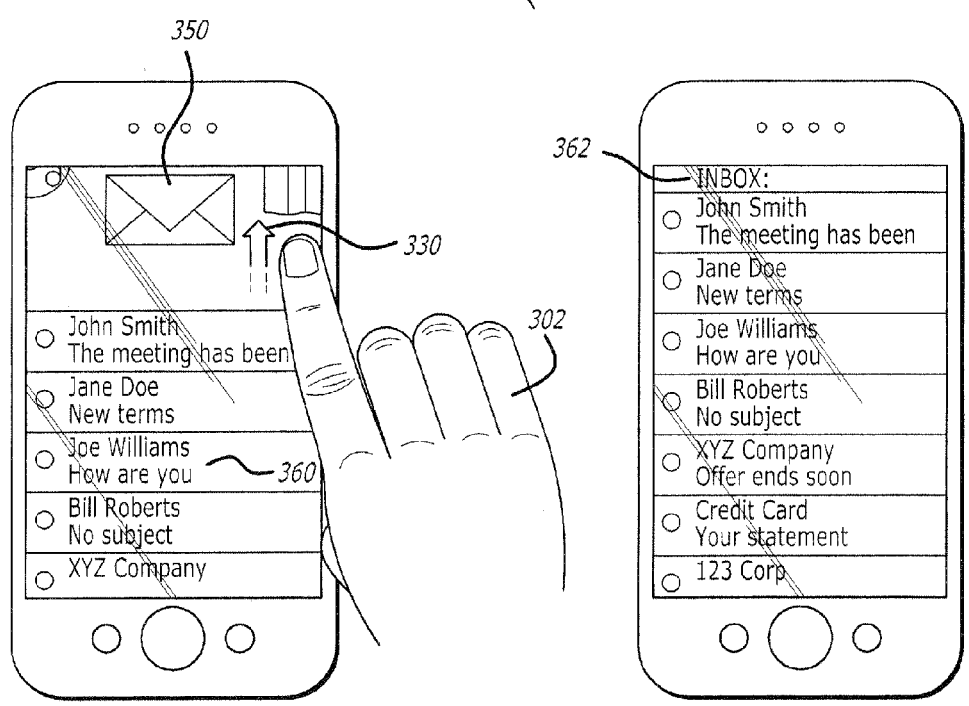
FIG. 3B
FIG. 3C

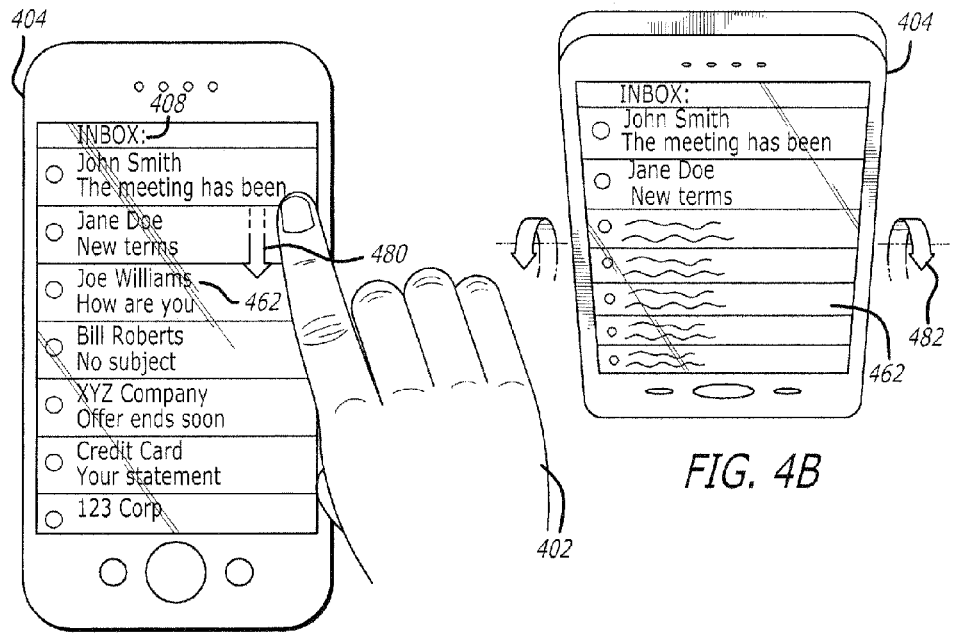
FIG. 4A
FIG. 4B
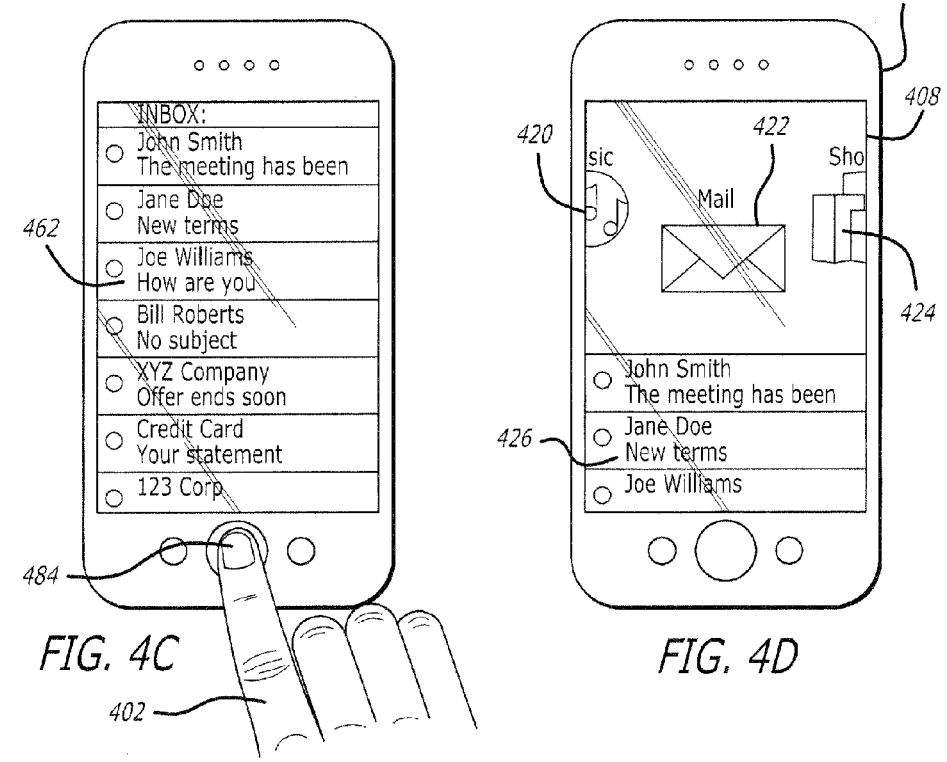
FIG. 4C
FIG. 4D

APPROACHES FOR SEAMLESSLY LAUNCHING APPLICATIONS

BACKGROUND

People are increasingly interacting with computers and other electronic devices to perform a wide variety of tasks. For example, users can browse websites, run applications, play music, videos, or other media, among other useful and interesting tasks. In many situations, users can navigate to and launch applications to view content. It is often the case, however, that it can be relatively difficult, or at least non-intuitive, for a user to easily and quickly navigate to a desired location for content provided by those applications. As such, as technology advances and as people are increasingly using electronic devices in a wider variety of ways, it can be advantageous to adapt the ways in which content is presented to users and the ways in which users interact with such content.

BRIEF DESCRIPTION OF THE DRAWINGS

Various embodiments in accordance with the present disclosure will be described with reference to the drawings, in which:

FIGS. 3(a), 3(b), and 3(c) illustrate another example approach to navigating through content presented via a computing device that can be utilized in accordance with various embodiments;

FIGS. 4(a), 4(b), 4(c), and 4(d) illustrate another example approach to navigating through content presented via a computing device that can be utilized in accordance with various embodiments;

DETAILED DESCRIPTION

Figure 1:
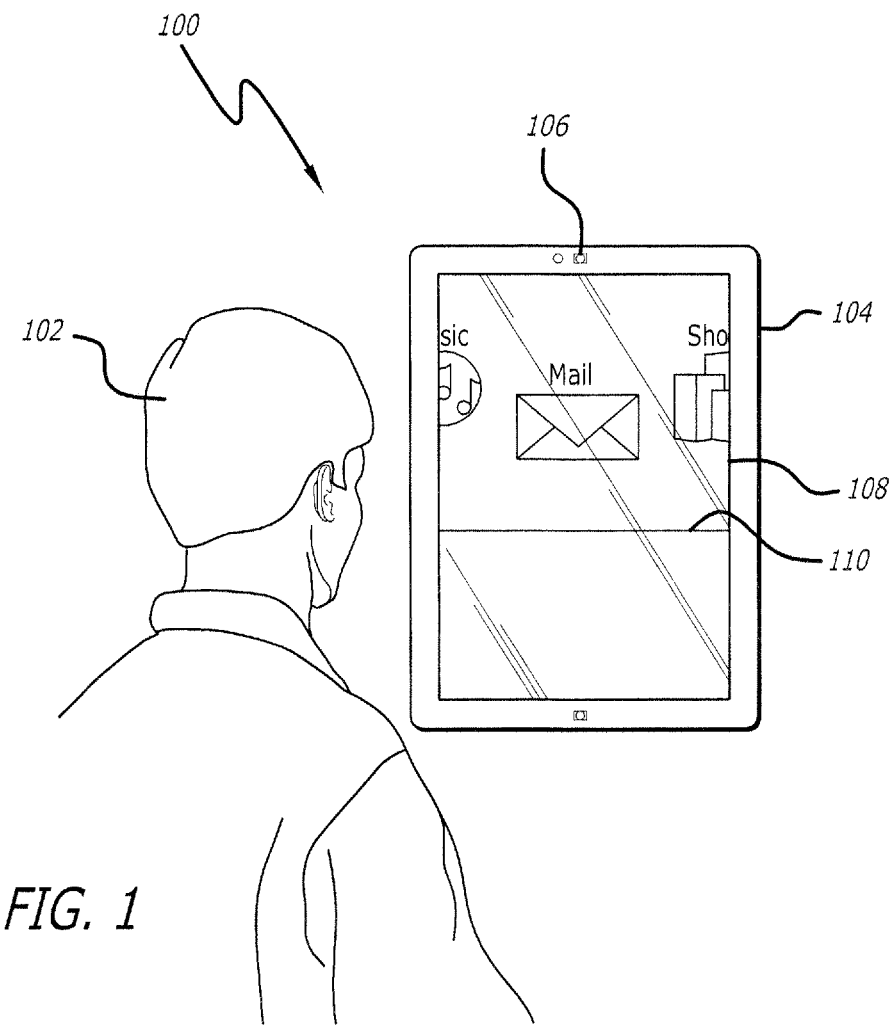
FIG. 1 illustrates an example environment in which aspects of the various embodiments can be utilized.

Systems and methods in accordance with various embodiments of the present disclosure overcome one or more of the above-referenced and other deficiencies in conventional approaches to managing and/or displaying data and other types of content on a display element of a computing device. In particular, approaches discussed herein enable a user to utilize a fingertip or other such object to provide input to a device, where the motion of the fingertip or object can be used to adjust the location and/or portion of the content being presented. The location of the content can cause the device to present additional content and/or enable at least one function associated with the content, such as launching an application associated with the content.

For example, a set of application icons or other graphical objects can be displayed on an interface (e.g., a home screen) of the computing device. The set of application icons can include a center or reference application icon and at least one of a subset of application icons to the left or to the right of the center application icon. The set of icons can appear to be arranged in two-dimensional (2D) or three-dimensional (3D) space. For example, the icons can be displayed in a "carousel" type arrangement, where the icons appear to wrap around the display screen of the device. The center icon can be displayed in a reference region of the display screen, which can correspond to the center of the display screen. Displayed below the set of application icons can be a portion of an application window. The application window can be associated with the center application icon and can display content associated with the center application icon. In various embodiments, the user can utilize a fingertip or object to select an area of the display screen associated with the application window and the user can perform a substantially vertical movement of the finger towards the top of the computing device to cause the presentation of the set of icons to appear to move off the display screen and the presentation of the application window to appear to expand (or otherwise move into view) to display additional content. Performing the vertical motion towards the top of the device or towards the bottom of the device can cause the presentation of set of icons to move on and off the display screen respectively, and can further cause the application window to expand and contract (or otherwise move into and out of view). In at least some embodiments, the user can perform the motion in contact with, or separated a distance from, a computing device. For example, the user might make motions on or near a touch-sensitive screen, which can be detected by a capacitive sensor or other such component of the device. The user also, or alternatively, might make the motion at a greater distance from the device, which might be detected by analyzing one or more images, or video, captured by the device, or by a device sensor such as an ultrasonic sensor. In accordance with various embodiments, when an amount of the application window presented on the display screen includes at least a predetermined area of the display screen, at least one additional feature of the application window can be enabled and/or the application can be launched, to allow for full access to features and navigation of the application.

Various other functions and advantages are described and suggested below as may be provided in accordance with the various embodiments.

FIG. 1 illustrates an example situation 100 wherein a user 102 is interacting with a computing device 104. Although a portable computing device (e.g., a smart phone, an electronic book reader, or tablet computer) is shown, it should be understood that various other types of electronic devices that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera 106 operable to perform functions such as image and/or video capture. The device can include additional image capture elements as well, as may include at least one other camera, a charge-coupled device (CCD), a motion detection sensor, or an infrared sensor, among others. As discussed further herein, the device can render an interface 110 (e.g., website, application interface, etc.) on a display screen 108 of the device. The interface can display content or information to a user. In various embodiments, the display screen can display images, icons, graphics, animations, or various other selectable objects to access such content. For example, the device can receive input from a user or object, such as a selection of an application icon, and the application corresponding to the icon can be launched to display content associated with the application. Oftentimes, however, a user must navigate through a series of screens in order to accomplish a particular task or to be presented with certain content. For example, a person may want to check their email. In this situation, the user may first have to navigate to a screen from which an email application may be launched and select on the icon that corresponds to the email application. In another example, a person may want to make a phone call to a contact in a phonebook. In this situation, the user may first have to navigate to a screen from which a phone application may be launched and then click on the icon that corresponds to the phone application. Upon launching the initial screen for the phone application, the user may navigate to another screen to access a contact list. From there, the user may have to scroll through the contacts and select a contact, which may pull up another screen that displays all the contact information. From this screen, the user may see another menu asking what the user wants to do with the contact, or the user may have to scroll down to find the telephone number to call.

Approaches in accordance with various embodiments enable a user to utilize a fingertip or other such object or gesture to navigate through content and enable functions associated with the content. As mentioned, a user can provide input to a device and the motion of the fingertip or object can be used to adjust the location and/or portion of the content being presented. The location of the content can cause the device to present additional content and/or enable at least one function associated with the content.

Figure 2A:
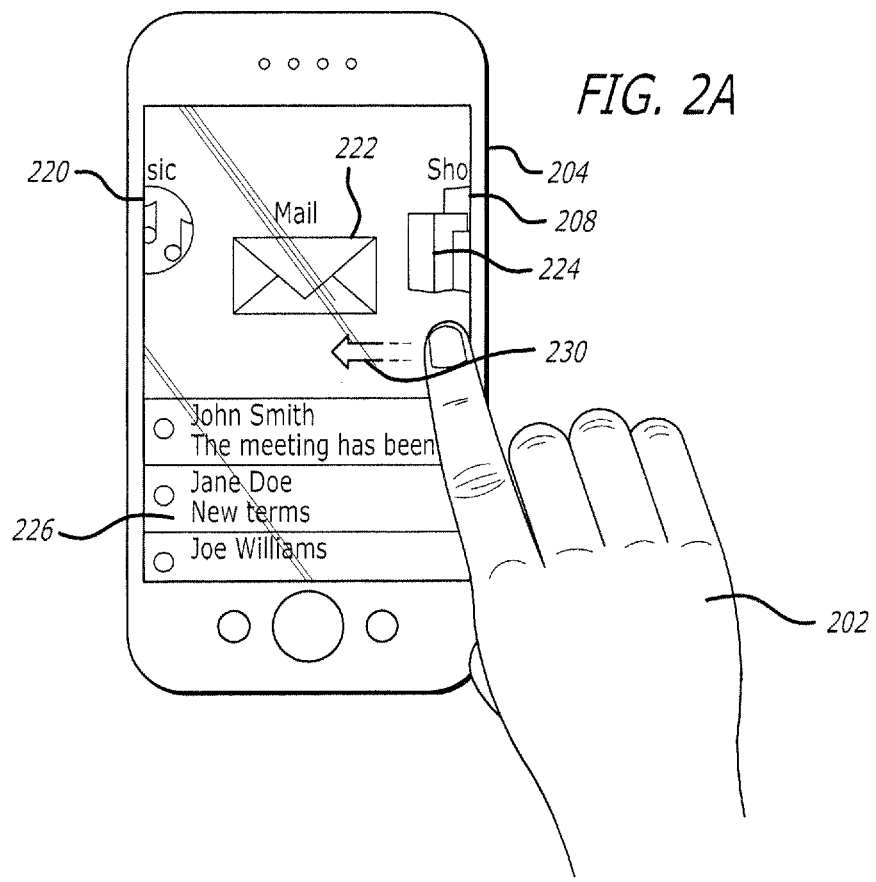
FIGS. 2(a) and 2(b) illustrate an example approach to navigating through content presented via a computing device that can be utilized in accordance with various embodiments.
Figure 2B:
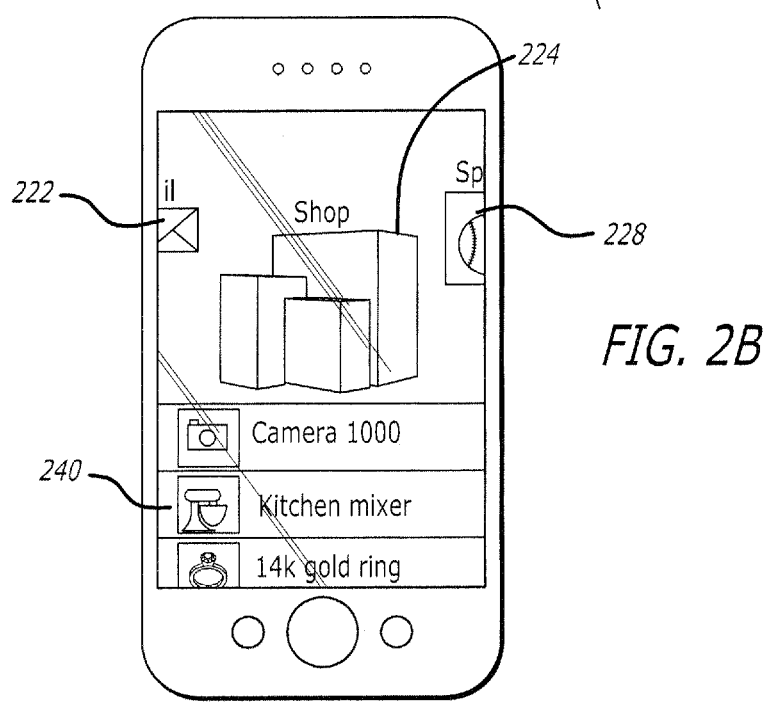

For example, FIGS. 2(a) and 2(b) illustrate an example approach to navigating through content presented via a computing device that can be utilized in accordance with various embodiments. FIG. 2(a) illustrates an example interface displayed on a display screen 208 of a computing device 204. In this example, the interface can be separated into at least two regions. The first region can include a set of application icons arranged in a carousel-type arrangement. It should be noted that although a set of application icons are displayed, any object can be displayed in the carousel-type arrangement. In accordance with various embodiments, the objects can include images, videos, audio clips, music albums, books, shortcuts to other content, contacts, among objects capable of being displayed on the display screen. Accordingly, the objects can represent content within an application. For example, a music album can be included in the carousel, and when the music album is selected, a music application or other similar application capable of playing audio can begin playing tracks included in the music album. In another example, the object can be a contact card for a person, and when the contact card is selected, a prompt whether to email, call, text, among other communication protocols can be displayed. In this way, the carousel can include shortcuts to applications, shortcuts to content within applications, and/or shortcuts to content. Displayed below the set of icons can, in a second region, can be a portion of an application window or other such display area. Displayed on the application window can be content associated with one of the application icons.

The set of application icons can include a center or reference application icon and at least one of a subset of application icons to the left or to the right of the center application icon. The set of icons can appear to be arranged in two-dimensional (2D) or three-dimensional (3D) space. For example, the icons can be displayed in a "carousel" type arrangement, where the icons appear to wrap around the display screen of the device. The center icon can be displayed in a reference region of the display screen, which can correspond to the center of the display screen. As shown in FIG. 2(a), a mail application icon 222 is displayed in the reference region. Displayed to the left of the mail application icon is a music application icon 220 and displayed to the right of the mail application icon is a shopping application icon 224. Other application icons, objects, interface elements, etc., can be arranged on various regions or areas of the carousel interface. It should be noted that although only three application icons are shown, any number of application icons or objects can be displayed on the carousel interface. In various embodiments, the carousel interface can appear in 3D in that the application icons or objects displayed thereon can appear to be at different depths relative to the surface of the display screen. For example, the some application icons can appear to be further from the display screen while other application icons can appear closer to the display screen. In this example, the application icon positioned in the reference region (e.g., center) can appear closest to the surface of the display screen.

In various embodiments, each application icon can be used to launch an associated application, content, navigational menus, and/or various other functions of the device such a camera or video application, light source, among others. For example, tapping a mail application icon can launch a mail application, tapping a music application icon can launch a music application, etc. In accordance with various embodiments, applications can include any number of applications, such as messaging applications (e.g., email, SMS, MMS, etc.), electronic shopping applications, navigation applications, social media applications, calendaring applications, web browsing applications, among other application types. Content can include, for example, media (e.g., audio, video, images, etc.), web browser bookmarks, documents, etc. Navigation menus can include, for example, menus or other navigation interfaces (e.g., favorites, shortcuts, etc.) to access other applications, settings, or other functions of the device. The application icons or objects can be represented as 2D or 3D graphical elements, text, or various other objects. In various embodiments, the application icons can include any number of, and/or combinations of shapes, colors, visual schemes, or 3D models (e.g., a 3D model of mail for launching a mail application).

The reference region can be located at the center of the carousel interface. In this example, the reference region displays the current application icon, the mail icon 222. It should be noted that other application icons or content can be located in the reference region. For example, in response to receiving a motion input (e.g., a swiping motion) with respect to the set of application icons, another application icon of the set of application icons can be caused to appear as the center application icon. Displayed below the carousel interface, in a second region, can be a portion of an application window 226. In this example, the application window can correspond to a preview of an inbox of a mail application. In various embodiments, the application window can display content corresponding to the application icon located in the reference region.

For example, if a user wants to display content corresponding to a different one of the application icons, the user can scroll through the application icons on the carousel interface to cause to be centered in the reference region the application to which the user would like to have content displayed. In this way, the carousel interface can include at least one scrolling area that the user can interact with to scroll or otherwise adjust an appearance of the application icons. In various embodiments, the location and the size of the scrolling area can be based on the size of the display screen and/or user defined, while in various embodiments the scrolling area can include any area along the carousel interface, the respective ends of the carousel interface, etc.

Scrolling through the application icons can include using a gesture to cause the icons on the carousel interface to move. In one embodiment, the user can scroll the application icons on the carousel interface by sliding a finger of a hand 202 along the carousel interface in the desired scrolling direction 230. In another embodiment, the user can contact an icon (e.g., contact the area of the display screen corresponding to the icon) and can make a sliding gesture towards either end of the carousel interface to scroll the application icons. In this way, the user can scroll the carousel interface in a counterclockwise direction by contacting a scrolling area in a clockwise direction and can scroll the carousel interface in a clockwise direction by contacting the scrolling area in a counterclockwise direction. It should be noted that while the user can perform the motion while contacting a touch screen using capacitive touch input, for example, the user in this example can also, or alternatively, perform the motion or gesture at a distance from the device, such that the motion in this example is captured by images or video captured by the front-facing camera. If the user's finger is within a detectable distance of the display screen, the substantially circular motion might also be able to be detected by the capacitive sensors of the touch screen. The user in this example can continue to move the fingertip in a clockwise pattern (from the perspective of the user, which would appear counter-clockwise from the perspective of the device in this example) to keep scrolling through the icons. It should be noted that other gestures such as flicking or sliding may be used to control scrolling. For example, the user can scroll the icons on the carousel interface by using a sliding gesture towards one of the ends of the carousel without releasing contact with the display screen.

As shown in FIG. 2(b), the user has scrolled the carousel interface in a clockwise direction causing the shopping application icon 224 move into the reference region, the mail application 222 to move out of the reference region, and the sport application 228 to move into view. As described, content associated with the application icon positioned in the reference region can be displayed below the carousel interface. In this example, one or more recommended items 240 from a shopping application are displayed in the application window.

In FIGS. 3(a), 3(b), and 3(c) the user wants to access additional content included in the application window. Accordingly, a user input motion can be detected from an area associated with the application window to the first region of the interface, which can animate a departure of the set of application icons from the display screen and an expansion of the portion of the application window to display additional content in the application window. For example, the user can utilize a fingertip or object to select an area of the display screen associated with the application window and can perform a substantially vertical movement of the finger towards the top of the computing device to cause the presentation of the set of icons to appear to move off the display screen and the presentation of the application window to appear to expand to display the additional content.

For example, FIG. 3(a) illustrates an example interface displayed on a display screen 308 of a computing device 304. As described, the interface can be separated into at least two regions. The first region can include can include a set of application icons arranged in a carousel-type arrangement. Displayed below the set of icons, in a second region, can be a portion of an application window. Displayed in the application window can be content associated with the center application icon positioned in a reference region. As shown in FIG. 3(a), a mail application icon 322 is displayed in the reference region. Displayed substantially to the left of the mail application icon is a music application icon 320 and displayed substantially to the right of the mail application icon is a shopping application icon 324.

In this example, the application window corresponds to a preview of an inbox 326 of a mail application. In various embodiments, the user might want to see additional content included in the application window, such as more email messages or an expanded view of one of the email messages. Accordingly, the user can utilize a fingertip of a hand 302 or object to select an area of the display screen associated with the application window, and the user can perform a substantially vertical movement 330 of the finger towards the top of the computing device to cause the presentation of the set of icons to appear to move off the display screen and the presentation of the application window to appear to expand to display additional content. For example, as shown in FIG. 3B, performing the vertical motion towards the top of the device can cause the presentation of set of icons 350 to move off the display screen and can further cause the application window 360 to slide further into view. As described, in at least some embodiments, the user can perform the motion in contact with, or separated a distance from, a computing device. For example, the user might make motions on or near a touch-sensitive screen, which can be detected by a capacitive sensor or other such component of the device. The user also, or alternatively, might make the motion at a greater distance from the device, which might be detected by analyzing one or more images, or video, captured by the device, or by a device sensor such as an ultrasonic sensor.

When an amount of the application window presented on the display screen fills at least a predetermined area of the display screen, at least one additional feature of the application window can be enabled. The predetermined area of the display screen can include, for example, at least 90 percent or more of the display screen, while in various other embodiments it can include more or less area of the display screen. The at least one additional feature can include providing links or other navigational icons within the application window. In various embodiments, the mail application can be "launched" when the amount of the application window presented on the display screen fills at least a predetermined area of the display screen. In this situation, the user can access a portion or all of the application and navigation features of the mail application. As shown in FIG. 3C, when the application window is caused to fill the entire display screen, the mail application is launched 362. In this situation, the user is presented a view of their mailbox corresponding to the mail application. The user can interact with and navigate the mail application just as if the user had launched the mail application from one or more conventional approaches (i.e., tapping the mail icon, launching from a search, etc.).

In various embodiments, the user may desire to return to the home screen. For example, the user may want to access the carousel interface or other home screen interface of the device. As described, in this example, the home screen includes the carousel interface and the application window. In accordance with various embodiments, there are a number of approaches to return to the home screen. For example, FIGS. 4(a), 4(b), 4(c), and 4(d) illustrate example approaches to navigating to a home screen in accordance with various embodiments. As shown in FIG. 4(a), the mail application has been launched and is presented as filling the entire display screen 408. When the mail application is launched, the user has full access to application and navigation features of the mail application. As described in regard to FIG. 3, the mail application can be launched when at least a predetermined amount of the application window is caused to fill the display screen on the computing device. In this example, the display screen displays the user's inbox 462.

The device can be caused to return to the home screen in a number of different ways. For example, a touch or gesture input or a change in orientation of the device can cause the device to return to the home screen. As shown in FIG. 4(a), the user can utilize a fingertip or object to select an area of the display screen proximate to the top of the device (e.g., the bezel of the device) and the user can perform a substantially vertical movement 480 of the finger towards the bottom of the computing device to cause the application to slide or otherwise begin to move in the direction of the user's finger. As the application window slides or otherwise moves towards the bottom of the screen (for example the second region), the carousel interface can move in from the top of the display screen towards the first region. Performing the vertical motion towards the top of the device or towards the bottom of the device can cause the presentation of set of icons to move on and off the display screen respectively, and can further cause the application window to expand and contract (or otherwise move into and out of view).

As shown in FIG. 4(b), the device can be caused to return to the home screen based on a change in orientation of the device. For example, tilting the device 482 (e.g., moving the top of the device towards the display screen and the bottom of the device away from the display screen) can cause the application to appear to slide, move, or otherwise appear to drop off the display screen towards the second region. As the application window slides or otherwise moves towards the bottom of the screen, the carousel interface can move in from the top of the screen towards the first region. The amount of tilt, and the direction of tilt (i.e., top of the device towards or away from the display screen) can cause the presentation of set of icons to move on and off the display screen respectively, and can further cause the application window to expand and contract (or otherwise move into and out of view). For example, tilting the top of the device away from the display screen can cause the presentation of the set of icons to move towards the top of the display screen. If the top of the device is continually tilted away from the device screen, the application can be caused to fill the entire display screen.

In some embodiments, a tilt may be too sensitive a command for accessing certain functions or content because a user may inadvertently initiate or open certain features. This could be inconvenient in some cases, therefore, in such cases, a flick would prove more reliable as a proof positive that the user intends to access the application. Relative to a tilt, a flick is a quick back and forth motion in a short window of time, which, depending on a sensitivity threshold, would eliminate inadvertent false positive commands from being passed to the device.

As discussed elsewhere herein, a device can have one or more elements or components that enable a change in orientation of the device to be determined. In one embodiment, a device can have an orientation-determining element such as an accelerometer, inertial sensor, or electronic gyroscope or compass that can provide input to the device as to an amount and direction of tilt, translation, or other such motion. In other embodiments, a device might use a camera or other such sensor to capture image information and analyze that image information to determine a direction and amount of motion.

As shown in FIG. 4(c), the device can be caused to return to the home screen by pressing a "home button" 484. A home button can be a button configured to cause the device to navigate from a current interface to the home screen of a computing device. In accordance with various embodiments, using any of the approaches described in regard to FIGS. 4(a), 4(b), and 4(c) can cause the device to navigate from a current interface to the home screen of the device. As described, the home screen can be separated into at least two regions. The first region can include a set of application icons arranged in a carousel-type arrangement and displayed below the set of icons can be a portion of an application window 426. Displayed in the application window can be content associated with one of the application icons. In this example, the set of icons includes a reference region at the center of the carousel interface. Positioned on either side of the center region can be at least one application icon. As shown in FIG. 4(d), a mail application icon 422 is displayed in the reference region. Displayed substantially to the left of the mail application icon is a music application icon 420 and displayed substantially to the right of the mail application icon is a shopping application icon 424.

Figure 5A:
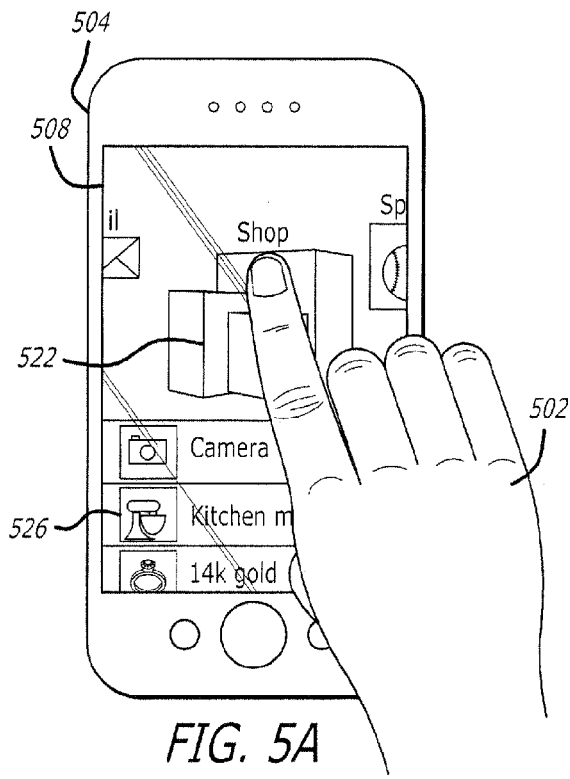
FIGS. 5(a), 5(b), 5(c), and 5(d) illustrate another example approach to navigating through content presented via a computing device that can be utilized in accordance with various embodiments.
Figure 5B:
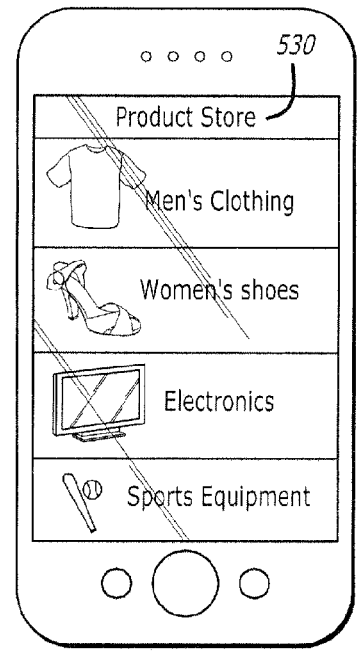
Figure 5C:
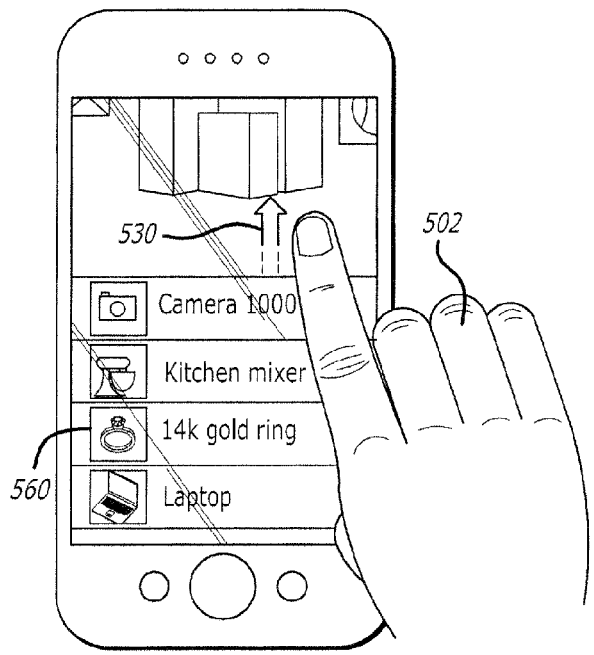
Figure 5D:
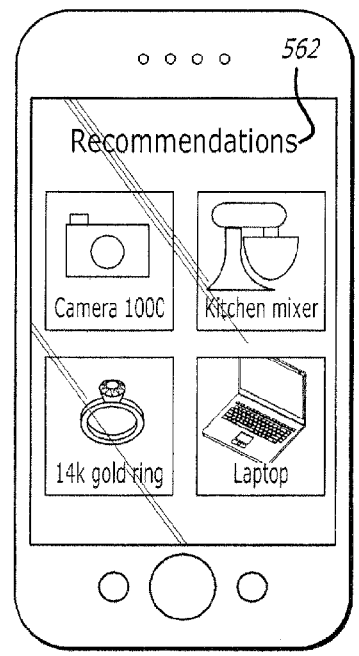

FIGS. 5(a), 5(b), 5(c), and 5(d) illustrate another example approach to navigating through content presented via a computing device that can be utilized in accordance with various embodiments. As described, an application can be launched by dragging or otherwise causing the application window to move and fill at least a predetermined amount of the display screen. Alternatively, the user can select any of the application icons on the carousel to launch the respective application. FIG. 5(a) illustrates an example interface displayed on a display screen 508 of a computing device 504. As described, the interface can be separated into at least two regions. The first region can include a set of application icons arranged in a carousel-type arrangement and displayed below the set of icons can be a portion of an application window 526. Displayed on the application window can be content associated with one of the application icons. The set of icons can include a reference region at the center of the carousel interface. Positioned on either side of the center region can be at least one application icon. As shown in FIG. 5(a), a shopping application icon 522 is displayed in the reference region. The user can launch the shopping application by tapping or otherwise selecting the shopping application icon. As shown in FIG. 5(b), upon selecting the shopping application icon, the device can navigate to the last known state of the shopping application or to the shopping application's landing/home page. In accordance with various embodiments, session or state information for one or more applications can be cached or otherwise stored on the device. The last know state can include the appearance and/or content from the last time the application was utilized. If no state information is available, the application can load the landing or home page of the application. As shown in FIG. 5(*b*), tapping the shopping icon can cause the device to open the shopping application, and since no state information is available, the shopping application is opened to the landing page/home page. In this example, the landing page displays a store front 530 of an electronic market place. In the situation where the last known state of the shopping application was a user's shopping cart, then the application would launch and display the user's shopping cart.

As described, the user can utilize a fingertip of a hand 502 or object to select an area of the display screen associated with the application window 560 and the user can perform a substantially vertical movement 530 of the finger towards the top of the computing device to cause the presentation of the set of icons to appear to move off the display screen and the presentation of the application window to appear to expand (or otherwise move into view) to display additional content. When an amount of the application window presented on the display screen fills at least a predetermined area of the display screen, at least one additional feature of the application window can be enabled. The at least one additional feature can include providing links or other navigational icons within the mail application, and in various embodiments, the application icon in the reference region can be "launched" when the amount of the application window presented on the display screen fills at least a predetermined area of the display screen. As shown in FIG. 5(*d*), the shopping application is positioned in the reference region and the application window is caused to display a listing of recommended items the user of the computing device may desire to purchase. In accordance with various embodiments, the recommendations can be based on the user's purchase history, user profile, etc.

Although the recommended page 562 of the shopping is launched, the user can access a portion or all of the application and navigation features of the application. Accordingly, the user can interact with and navigate the shopping application just as if they had launched the shopping application from one or more conventional approaches (i.e., tapping the shopping icon, launching from a search, etc.). In accordance with various embodiments, as the user navigates the shopping application for at least a predetermined period of time, navigates to a predetermined number of pages within the application, etc., the state of the shopping application can be set to include the state information associated with the current use of the application. The state information can include the current page being viewed, navigation history, shopping carts, and any other information. In this situation, if the user were to return to the home screen and launch the shopping application, for example by tapping the shopping application icon, the shopping application would launch to the most recent state. It should be noted that various other state or session changes are contemplated in accordance with the various embodiments described herein.

Figure 6:
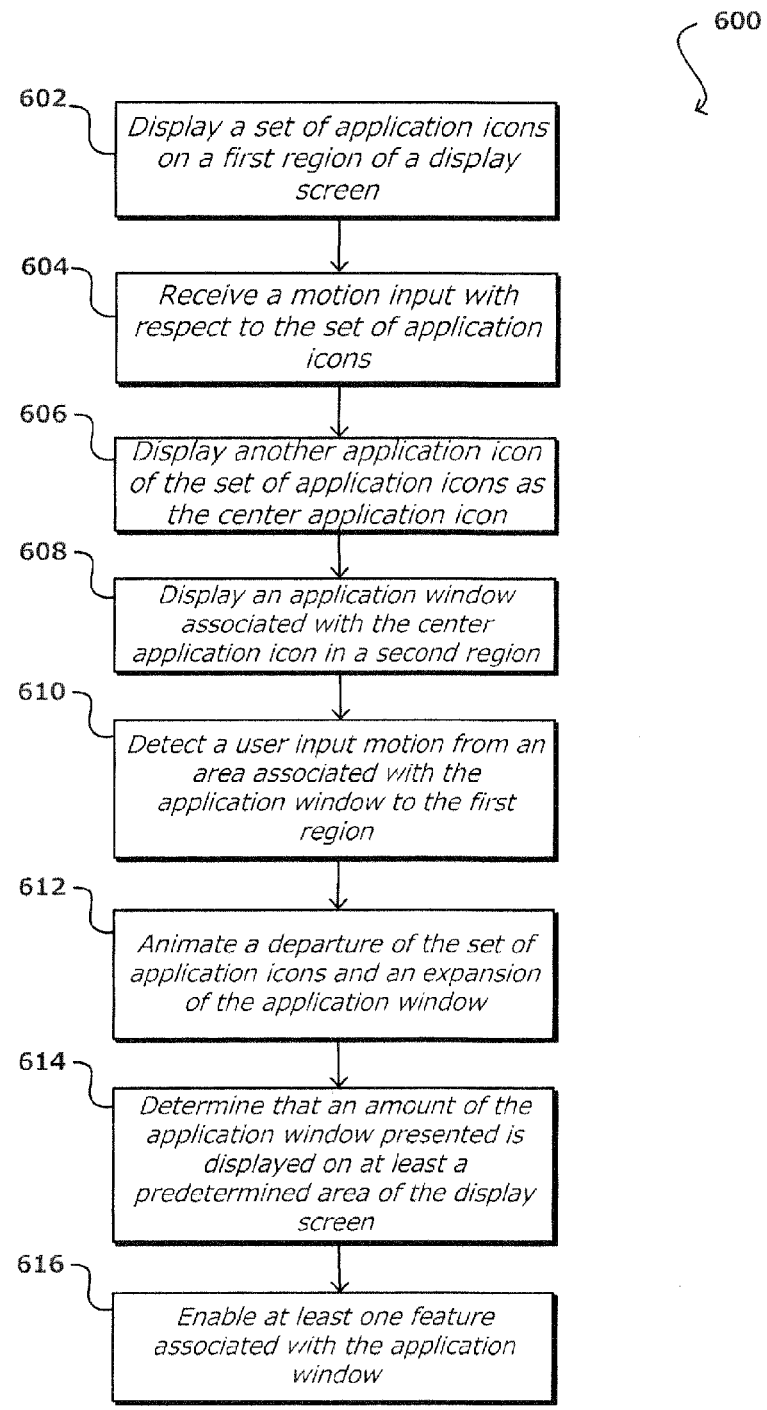
FIG. 6 illustrates an example process for navigating through content presented via a computing device in accordance with at least one embodiment.

FIG. 6 illustrates an example process for navigating through content presented via a computing device in accordance with at least one embodiment. It should be understood that there can be additional, fewer, or alternative steps performed in similar or alternative orders, or in parallel, within the scope of the various embodiments unless otherwise stated. A set of application icons can be displayed 602 on an interface (e.g., a home screen) of a computing device. The set of application icons can include a center application icon and at least one of a subset of application icons to the left or to the right of the center application icon, the set of application icons being displayed in a first region of the interface. The set of icons can appear to be arranged in two-dimensional (2D) or three-dimensional (3D) space. For example, the icons can be displayed in a "carousel" type arrangement, where the icons appear to wrap around the display screen of the device. The center icon can be displayed in a reference region of the display screen, which can correspond to the center of the display screen. In response to receiving 604 a motion input with respect to the set of application icons, caused to be displayed 606 another application icon of the set of application icons as the center application icons. The device can display 608, on the display screen, an application window associated with the center application icon in a second region of the interface, the second region being below the first region of the display screen. The application window can display content associated with the center application icon. A user input motion can be detected 610 from an area associated with the application window to the first region of the interface, which can animate 612 a departure of the set of application icons from the display screen and an expansion of the portion of the application window to display additional content in the application window.

For example, the user can utilize a fingertip or object to select an area of the display screen associated with the application window and the user can perform a substantially vertical movement of the finger towards the top of the computing device to cause the presentation of the set of icons to appear to move off the display screen and the presentation of the application window to appear to expand (or otherwise move into view) to display additional content. Performing the vertical motion towards the top of the device or towards the bottom of the device can cause the presentation of set of icons to move on and off the display screen respectively, and can further cause the application window to expand and contract (or otherwise move into and out of view). In at least some embodiments, the user can perform the motion in contact with, or separated a distance from, a computing device. For example, the user might make motions on or near a touch-sensitive screen, which can be detected by a capacitive sensor or other such component of the device. The user also, or alternatively, might make the motion at a greater distance from the device, which might be detected by analyzing one or more images, or video, captured by the device, or by a device sensor such as an ultrasonic sensor. When it is determined 614 that an amount of the application window presented on the display screen includes at least a predetermined area of the display screen, at least one additional feature of the application window can be enabled 616 and/or the application can be launched, to allow for full access to features and navigation of the application.

Figure 7:
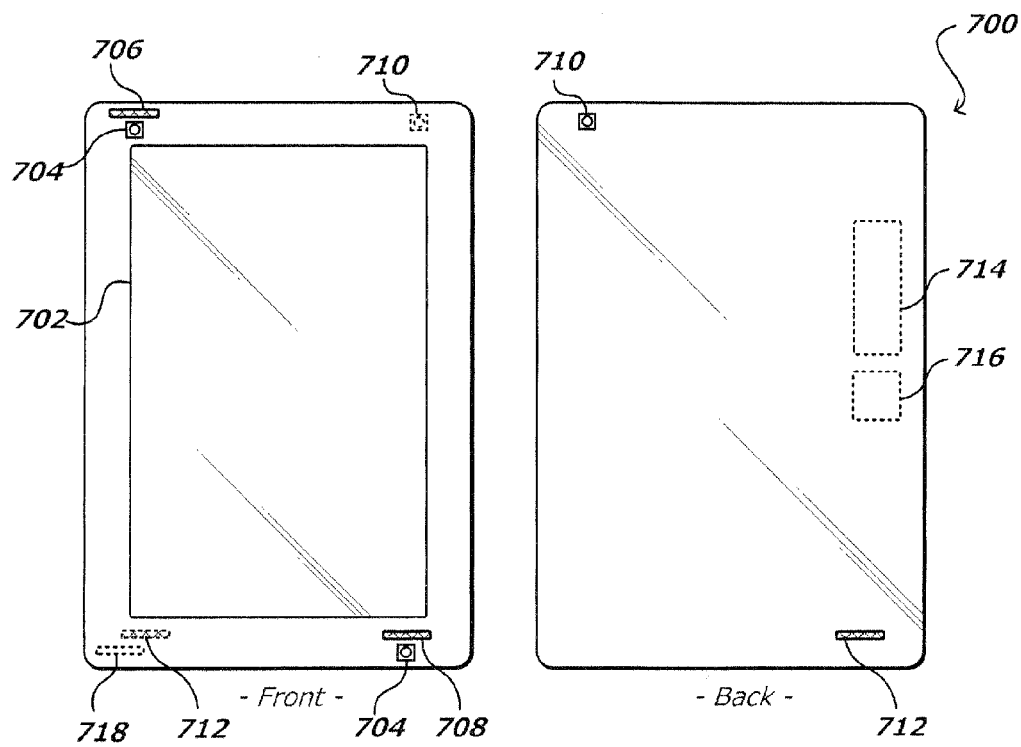
FIG. 7 illustrates an example device that can be used to implement aspects of the various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled sensor (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such component. Various other elements and/or combinations are possible as well within the scope of various embodiments.

Figure 8:
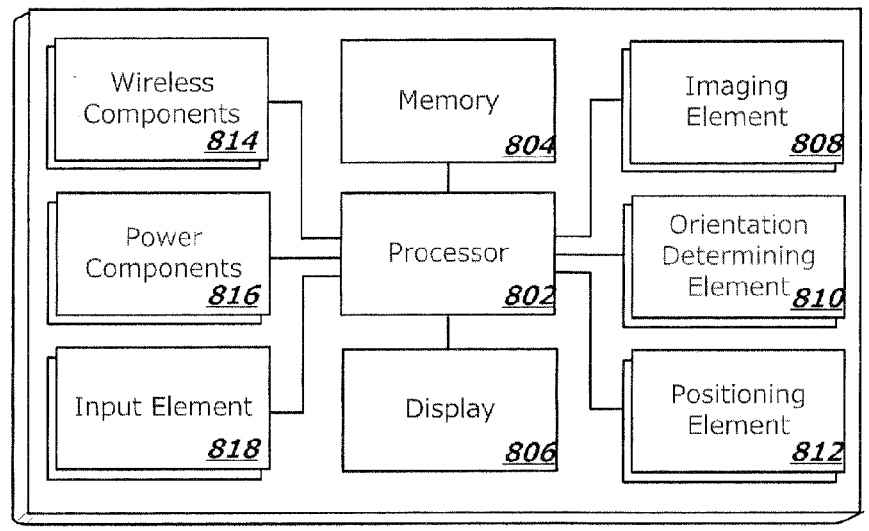
FIG. 8 illustrates example components of a client device such as that illustrated in FIG. 7.

FIG. 8 illustrates a set of basic components of an electronic computing device 800 such as the device 700 described with respect to FIG. 7. In this example, the device includes at least one processing unit 802 for executing instructions that can be stored in a memory component or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 818 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc.

A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 9:
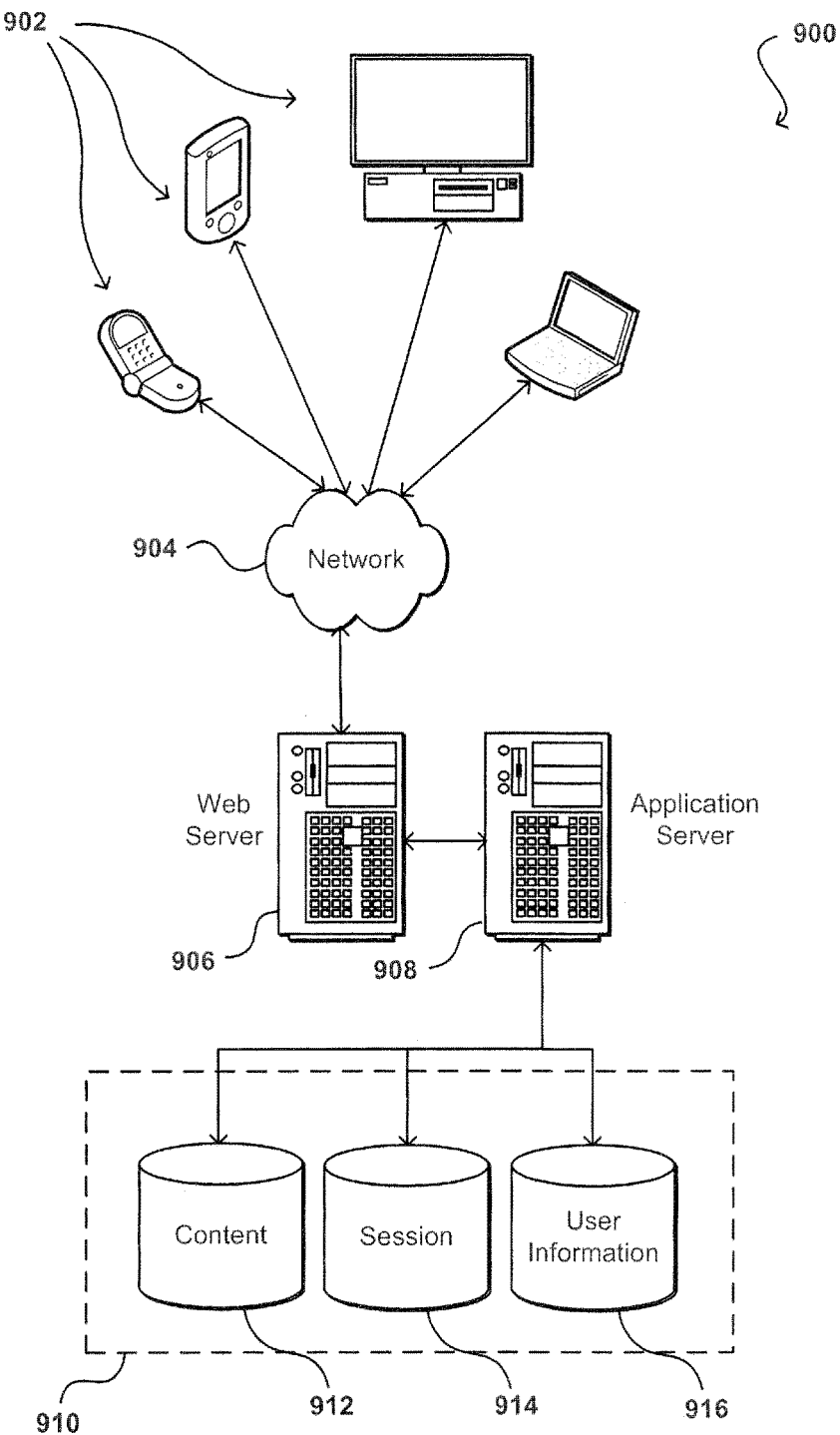
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any components or combination of components capable of storing, accessing and retrieving data, which may include any combination and number of data servers, databases, data storage components and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 919. The data store 919 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network components may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing components such as network input/output components may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system component. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   a display screen;
   at least one processor; and
   a memory including instructions that, when executed by the at least one processor, cause the computing device to:
      determining a set of icons corresponding to one or more applications, the set of icons include at least a first icon, a second icon, and a third icon;
      display, on the display screen, the set of icons in a carousel arrangement in a first region of an interface of the computing device, the carousel arrangement including a center position, a left position relative to the center position, and a right position relative to the center position, the first icon displayed in the center position, the second icon displayed in the left position, and the third icon displayed in the right position;
      in response to receiving a first touch input corresponding to the first region of the interface, causing display of the second icon in the center position;
      display, on the display screen, in a second region of the interface adjacent the first region of the interface, a window of content associated with the second icon displayed in the center position;
      detect a swipe input from the second region to the first region of the interface;
      animate, based at least in part on the swipe input, a departure of the set of icons from the display screen and an expansion of the window of content to display additional content; and
      present an application associated with the second icon after the additional content displayed in a portion of the display screen exceeds a predetermined threshold area of the display screen.

2. The computing device claim 1, wherein the application associated with the second icon includes a plurality of functions, wherein at least one function of the plurality of functions is disabled prior to presentation of the application, wherein the instructions, when executed, further cause the computing device to:
   enable the at least one function in response to launching the application.

3. The computing device claim 1, wherein the window is associated with an application, and wherein the instructions, when executed, further cause the computing device to:
   detect a second swipe input from the first region to the second region of the interface; and
   animate an arrival of the set of icons to the first region of the display screen in response to the second swipe input.

4. The computing device claim 3, wherein the swipe input includes a finger or object contacting an area of the display screen and maintaining contact with the display screen while moving substantially vertically across the display screen.

5. A computer-implemented method comprising:
   determining a set of graphical elements corresponding to one or more applications;
   displaying the set of graphical elements in a carousel arrangement in a first region of a display screen of a computing device, the carousel arrangement including a center position, a left position relative to the center position, and a right position relative to the center position;

displaying content in a second region of the display screen, the content associated with a first graphical element of the set of graphical elements displayed in the center position;

detecting a swipe input from the second region of the display screen to the first region of the display screen, the swipe input corresponding to a request for additional content associated with the first graphical element;

animating, based at least in part on the swipe input, a departure of the set of graphical elements from the display screen and an expansion of the second region to display the additional content; and presenting an application corresponding to the first graphical element after the additional content displayed in a portion of the display screen exceeds a predetermined threshold area of the display screen.

6. The computer-implemented method of claim 5, wherein the application corresponding to the first graphical element includes a plurality of functions, wherein at least one function of the plurality of functions is disabled prior to presenting the application, and wherein the method further includes:

enabling the at least one function based at least in part on presenting the application.

7. The computer-implemented method of claim 5, wherein an amount of the expansion of the second region to display the additional content is based at least in part upon a distance of movement of the swipe input from the second region of the display screen to the first region of the display screen.

8. The computer-implemented method of claim 5, wherein detecting the swipe input corresponding from the second region of the display screen to the first region of the display screen further comprises:

detecting contact of a control implement with the display screen of the computing device; and detecting movement of the control implement in a direction while the control implement is in contact with the display screen.

9. The computer-implemented method of claim 5, further comprising:

detecting a second input corresponding to a request to display the set of graphical elements; and animating an arrival of the set of graphical elements in the carousel arrangement in the first region of the display screen.

10. The computer-implemented method of claim 9, wherein the second input comprises a physical button press.

11. The computer-implemented method of claim 5, further including:

detecting a third touch input corresponding to a request to move the set of graphical elements in the carousel arrangement;

animating a rotation of the carousel arrangement in a direction by changing a display of graphical elements in the right position, the center position, and the left position; and displaying second content in the second region of the display screen, the second content associated with a second graphical element displayed in the center position.

12. The computer-implemented method of claim 11, wherein the third touch input includes one of a horizontal movement or a vertical movement of a control implement across the set of graphical elements, and wherein animating the rotation of the carousel arrangement includes shifting the set of graphical elements in a direction corresponding to the horizontal movement or the vertical movement of the control implement.

13. The computer-implemented method of claim 5, and wherein the content is associated with the first application.

14. The computer-implemented method of claim 8, wherein the control implement is selected from a group consisting of a finger, a hand, and a stylus.

15. The computer-implemented method of claim 5, wherein the method further includes:

receiving a selection of the first graphical element; and launching the application based at least in part on the selection of the first graphical element.

16. A non-transitory computer readable storage medium storing one or more sequences of instructions executable by one or more processors to perform a set of operations comprising:

determining a set of graphical elements corresponding to one or more applications;

displaying the set of graphical elements in a carousel arrangement in a first region of a display screen of a computing device, the carousel arrangement including a center position, a left position relative to the center position, and a right position relative to the center position;

displaying content in a second region of the display screen, the content associated with a first graphical element of the set of graphical elements displayed in the center position;

detecting a swipe input from the second region of the display screen to the first region of the display screen, the swipe input corresponding to a request for additional content associated with the first graphical element;

animating, based at least in part on the swipe input, a departure of the set of graphical elements from the display screen and an expansion of the second region to display the additional content; and presenting an application corresponding to the first graphical element after the additional content displayed in a portion of the display screen exceeds a predetermined threshold area of the display screen.

17. The non-transitory computer readable storage medium of claim 16, wherein the application corresponding to the first graphical element includes a plurality of functions, wherein at least one function of the plurality of functions is disabled prior to presenting the application, and wherein the one or more sequences of instructions, when executed by the one or more processors, cause the one or more processors to perform the operations of:

enabling the at least one function in response to presenting the application.

18. The non-transitory computer readable storage medium of claim 16, further comprising instructions executed by the one or more processors to perform the operations of:

detecting a second input corresponding to a request to display the set of graphical elements; and animating an arrival of the of the set of graphical elements in the carousel arrangement in the first region of the display screen.

19. The non-transitory computer readable storage medium of claim 18, wherein the one or more sequences of instructions, when executed by the one or more processors, cause the one or more processors to perform the operations of:

detecting a control motion performed by a control implement;

adjusting a presentation of the set of graphical elements during the control motion to display a different graphical element of the set of graphical elements in the center position, a direction of the adjusting being based at least in part on a direction of the control motion; and displaying second content in the second region of the display screen, the second content associated with the different graphical element in the center position.

20. The non-transitory computer readable storage medium of claim 19, wherein the control motion includes one of a horizontal movement or a vertical movement of a control implement across the set of graphical elements, and wherein adjusting the presentation of the set of graphical elements includes shifting the set of graphical elements in a direction corresponding to the horizontal movement or the vertical movement of the control implement.

* * * * *